(12) United States Patent
Pauley, Jr. et al.

(10) Patent No.: US 9,152,820 B1
(45) Date of Patent: *Oct. 6, 2015

(54) METHOD AND APPARATUS FOR COOKIE ANONYMIZATION AND REJECTION

(75) Inventors: Wayne A. Pauley, Jr., Hudson, NH (US); Stephen J. Todd, Shrewsbury, MA (US); Michel F. Fisher, Natick, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/436,702

(22) Filed: Mar. 30, 2012

(51) Int. Cl.
*H04L 29/06* (2006.01)
*G06F 21/62* (2013.01)

(52) U.S. Cl.
CPC ............ *G06F 21/6263* (2013.01); *H04L 63/10* (2013.01)

(58) Field of Classification Search
CPC .... H04L 63/10; H04L 67/146; G06F 21/6263
USPC .......................................................... 726/22
See application file for complete search history.

(56) References Cited

U.S. PATENT DOCUMENTS

| | | | | |
|---|---|---|---|---|
| 6,085,224 | A * | 7/2000 | Wagner .......................... | 709/203 |
| 6,959,420 | B1 * | 10/2005 | Mitchell et al. ................ | 715/745 |
| 7,562,387 | B2 * | 7/2009 | Nguyen et al. .................. | 726/22 |
| 7,571,322 | B2 * | 8/2009 | Karoubi ......................... | 713/172 |
| 7,603,356 | B2 * | 10/2009 | Schran et al. .......................... | 1/1 |
| 7,614,002 | B2 * | 11/2009 | Goldfeder et al. ............. | 715/745 |
| 7,730,532 | B1 * | 6/2010 | Yeo ................................. | 726/22 |
| 8,073,853 | B2 * | 12/2011 | Schran et al. .................. | 707/748 |
| 8,090,877 | B2 * | 1/2012 | Agarwal et al. ............... | 709/246 |
| 8,166,406 | B1 * | 4/2012 | Goldfeder et al. ............ | 715/745 |
| 8,176,163 | B1 * | 5/2012 | Fikes et al. ..................... | 709/223 |
| 8,392,977 | B2 * | 3/2013 | He et al. ............................ | 726/9 |
| 8,484,287 | B2 * | 7/2013 | Gavini et al. .................. | 709/203 |
| 8,561,155 | B2 * | 10/2013 | He et al. ............................ | 726/5 |
| 8,856,869 | B1 * | 10/2014 | Brinskelle ......................... | 726/2 |
| 8,949,462 | B1 * | 2/2015 | Djabarov et al. ............. | 709/246 |
| 8,997,076 | B1 * | 3/2015 | Djabarov et al. ............. | 717/168 |
| 2002/0051541 | A1 * | 5/2002 | Glick et al. .................... | 380/258 |
| 2002/0078192 | A1 * | 6/2002 | Kopsell et al. ................ | 709/223 |
| 2002/0143770 | A1 * | 10/2002 | Schran et al. .................... | 707/10 |
| 2002/0143861 | A1 * | 10/2002 | Greene et al. ................. | 709/203 |
| 2003/0051157 | A1 * | 3/2003 | Nguyen et al. ................ | 713/201 |
| 2003/0158889 | A1 * | 8/2003 | Massarani et al. ............ | 709/203 |
| 2004/0006602 | A1 * | 1/2004 | Bess et al. ...................... | 709/207 |
| 2005/0257250 | A1 * | 11/2005 | Mitchell et al. ................... | 726/3 |

(Continued)

*Primary Examiner* — David Garcia Cervetti
(74) *Attorney, Agent, or Firm* — Krishnendu Gupta; Gerald P. Kazanjian

(57) ABSTRACT

Example embodiments of the present invention provide a method, an apparatus and a computer program product for cookie anonymization and rejection. The method includes receiving a cookie included in a data stream transmitted from a source intended for a destination. A lexical analysis of the cookie included in the data stream is then performed to determine state information associated with the cookie. The state information associated with the cookie then may be forwarded to the destination according to the lexical analysis. Example embodiments of the present invention specifically targets cookies and beacons that flow through a system, and historically track cookie and beacon traffic in order to perform drill-down inspection on the contents. This inspection allows for detection of sensitive information such as credit cards, location, and any other personal info, as well as the potential presence of malware which is performing unusual behavior within the private system.

19 Claims, 10 Drawing Sheets

(56) References Cited

U.S. PATENT DOCUMENTS

| | | | |
|---|---|---|---|
| 2006/0075122 A1* | 4/2006 | Lindskog et al. | 709/228 |
| 2007/0300285 A1* | 12/2007 | Fee et al. | 726/1 |
| 2008/0034198 A1* | 2/2008 | He et al. | 713/151 |
| 2008/0034413 A1* | 2/2008 | He et al. | 726/9 |
| 2008/0034417 A1* | 2/2008 | He et al. | 726/15 |
| 2008/0263627 A1* | 10/2008 | Berteau et al. | 726/1 |
| 2009/0106349 A1* | 4/2009 | Harris | 709/203 |
| 2009/0193129 A1* | 7/2009 | Agarwal et al. | 709/229 |
| 2009/0199285 A1* | 8/2009 | Agarwal et al. | 726/9 |
| 2010/0023999 A1* | 1/2010 | Schran et al. | 726/1 |
| 2010/0043065 A1* | 2/2010 | Bray et al. | 726/8 |
| 2011/0126290 A1* | 5/2011 | Krishnamurthy et al. | 726/26 |
| 2011/0138174 A1* | 6/2011 | Aciicmez et al. | 713/165 |
| 2011/0154488 A1* | 6/2011 | Rajan et al. | 726/22 |
| 2011/0161172 A1* | 6/2011 | Lee | 705/14.55 |
| 2011/0191664 A1* | 8/2011 | Sheleheda et al. | 715/205 |
| 2011/0208850 A1* | 8/2011 | Sheleheda et al. | 709/223 |
| 2011/0320616 A1* | 12/2011 | Wray | 709/228 |
| 2012/0036178 A1* | 2/2012 | Gavini et al. | 709/203 |
| 2012/0042009 A1* | 2/2012 | Schran et al. | 709/203 |
| 2012/0054680 A1* | 3/2012 | Moonka et al. | 715/810 |
| 2012/0084151 A1* | 4/2012 | Kozak et al. | 705/14.58 |
| 2012/0084348 A1* | 4/2012 | Lee et al. | 709/203 |
| 2012/0096068 A1* | 4/2012 | Canning et al. | 709/203 |
| 2012/0173870 A1* | 7/2012 | Reddy et al. | 713/153 |
| 2012/0240050 A1* | 9/2012 | Goldfeder et al. | 715/745 |
| 2013/0167195 A1* | 6/2013 | Etchegoyen | 726/3 |
| 2013/0173815 A1* | 7/2013 | Canning et al. | 709/228 |
| 2014/0075553 A1* | 3/2014 | Hansen | 726/22 |

* cited by examiner

METHOD AND APPARATUS FOR COOKIE ANONYMIZATION AND REJECTION

CROSS REFERENCE TO RELATED APPLICATIONS

This Application is related to U.S. patent application Ser. No. 13/247,423 entitled "METHOD AND APPARATUS FOR FRIENDLY MAN-IN-THE-MIDDLE DATA STREAM INSPECTION", Ser. No. 13/247,549 entitled "METHOD AND APPARATUS FOR PRIVACY-RESPECTING NOTIFICATION OF SECURITY THREATS", and Ser. No. 13/247,623 entitled "METHOD AND APPARATUS FOR ENCRYPTION WITH VIEWER IDENTITY- AND CONTENT ADDRESS-BASED IDENTITY PROTECTION", filed on Sep. 28, 2011, the teachings of which are hereby incorporated by reference in their entirety.

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application relates to data privacy.

BACKGROUND

Privacy is the claim of individuals, groups or institutions to determine for themselves when, how, and to what extent information about them is communicated to others. Private information is frequently made public or semi-public via emails, blogs and postings to social networking services, such as Facebook, Twitter, LinkedIn and FourSquare, often without foresight as to the consequences of such a divulgence. It has been reported that information publicly posted to social networking services has been used in firing individuals from their employment and has been used by criminals to find targets for burglaries.

Additionally, intentionally divulged information that is intended to be maintained as private is routinely sold to advertisers and information brokers. Moreover, with the proliferation of app usage in mobile devices, additional information is available on the "information market," including users' location, age, gender, income, ethnicity, sexual orientation and political views. As recently reported by the Wall Street Journal, of 101 popular smartphone apps, 56 transmitted the device ID without the user's consent, 47 sent location information, and 5 sent age, gender and other personally identifiable information is outsiders.

SUMMARY

Example embodiments of the present invention provide a method, an apparatus and a computer program product for cookie anonymization and rejection. The method includes receiving a cookie included in a data stream transmitted from a source intended for a destination. A lexical analysis of the cookie included in the data stream is then performed to determine state information associated with the cookie. The state information associated with the cookie then may be forwarded to the destination according to the lexical analysis.

BRIEF DESCRIPTION OF THE DRAWINGS

The above and further advantages of the present invention may be better under stood by referring to the following description taken into conjunction with the accompanying drawings in which.

DETAILED DESCRIPTION

Figure 1:
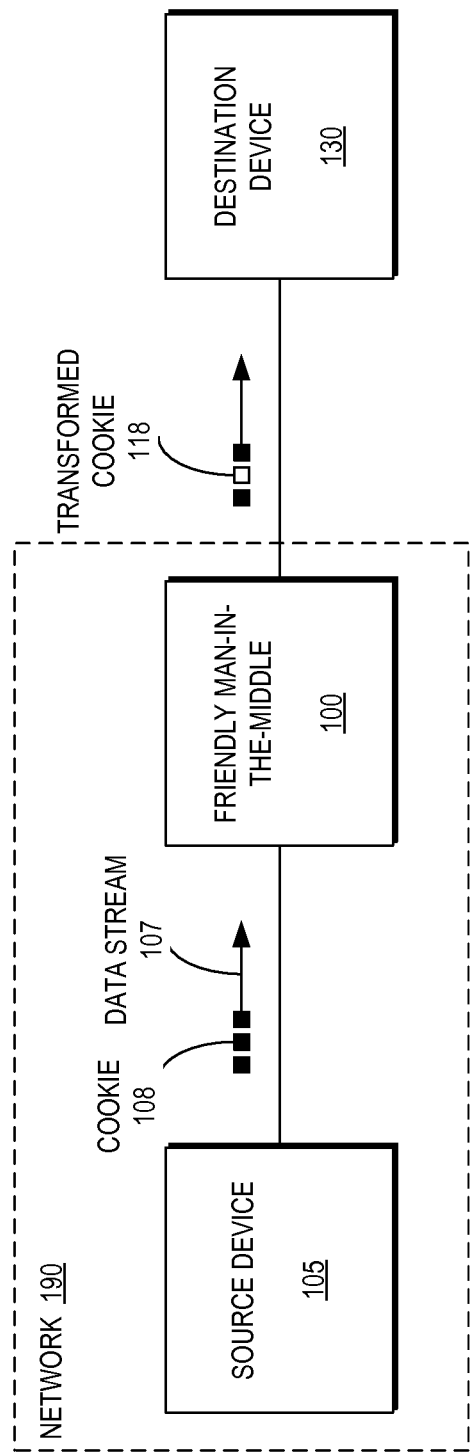
FIGS. 1 and 2 are block diagrams illustrating an example embodiment of the present invention deployed in a network environment.

As the number of Internet-connected devices in the home and the enterprise continues to rise, the concept of privacy is increasingly caught in the midst of two divergent forces: that individual, group or institution's likely desire to maintain information as private, and the increasing vulnerability of such information to a privacy breach or unintended disclosure. Internet-connected devices in the household/enterprise may include personal computers, laptop computer, televisions, audiovisual receiver, music players, radio, appliances and gaming systems. While many of these devices have a method to block Internet access wholesale, they lack finer-grain controls for limiting Internet access.

For example, current methods for controlling the disclosure of private information include centralized devices that block wholesale access to a particular resource by using source/destination routing filters, regardless of content that is being sent to or received from that resource. Further, while there are some endpoint-based protections that examine content, they are one-off per client, require an administrator to set up and manage each device manually, and do not protect all device types (i.e., are only available on certain platforms). Moreover, while many of these devices provide logging capabilities, the rapidly increasing number of such devices and the amount of information they log removes from the realm of possibility an administrator's ability to police those logs to determine, albeit after the fact, private information that was disclosed.

Part of the content flowing over the network is cookies/beacons. Cookies provide an unknown leakage of private information from internal systems to external networks. One example of a cookie is a key-click cookie, which enables marketing for every click that a user is making and is often associated with free applications. That cookie may contain sensitive information like name, age, sex, location, account numbers, etc. Malware can hijack cookies and accelerate the leakage of information by continually uploading sensitive information at a very high rate. Web beacons leak user activity between websites out to external sources.

As understood in the art, these objects are buffers that may be filtered and examined. However, traditional packet inspectors typically only look at fingerprint, source, and destination information, but do not inspect at the content level. Therefore, content-aware drill-down analysis of cookies/beacons may enable an administrator to decipher cookie content and establish one or more policies to either block or anonymize cookies/beacons. Further, the pace and frequency of cookies can also be viewed.

Therefore, a centralized point of control is desirable that performs a lexical analysis of cookies/beacons in a data stream. Within the household, for example, a broadband router is generally a common access point for most home-based Internet-connected devices. In other words, example embodiments of the present invention provide an intelligent layer implemented, for example, in the router (or as a standalone device) that can inspect the payload of a cookie/beacon in a data stream for keywords and employ a blocking or masking mechanism to protect unauthorized or potentially harmful data from escaping the household (i.e., intentional or accidental), irrespective of source-type (i.e., agentless) and in a manner transparent to the destination.

Example embodiments of the present invention specifically targets cookies and beacons that flow through a system, and historically track cookie and beacon traffic in order to perform drill-down inspection on the contents. This inspection allows for detection of sensitive information such as credit cards, location, and any other personal info, as well as the potential presence of malware which is performing unusual behavior within the private system.

FIG. 1 is a block diagram illustrating an example embodiment of the present invention 100 in a network environment 190. As illustrated in FIG. 1, the network 190 includes a source device 105 that may transmit a data stream 107, including a cookie 108, intended for a destination (e.g., destination device 130). However, a friendly (i.e., blessed) man-in-the-middle (FMITM) 100 receives (i.e., intercepts) the data stream 107 before the data stream escapes the network 190 toward the destination device 130. As will be discussed in greater detail below, the FMITM 100 performs a lexical analysis of content (i.e., payload) of cookies 108 included in the data stream 107. The FMITM 100 then forwards the cookie 108 out of the network 190 to the intended destination device 130 as a transformed data stream 118 according to the lexical analysis. It should be noted that, in certain embodiments, the transformed data stream 118 may be a blocking of the cookie 108 or an anonymization of the cookie 108.

Figure 2:
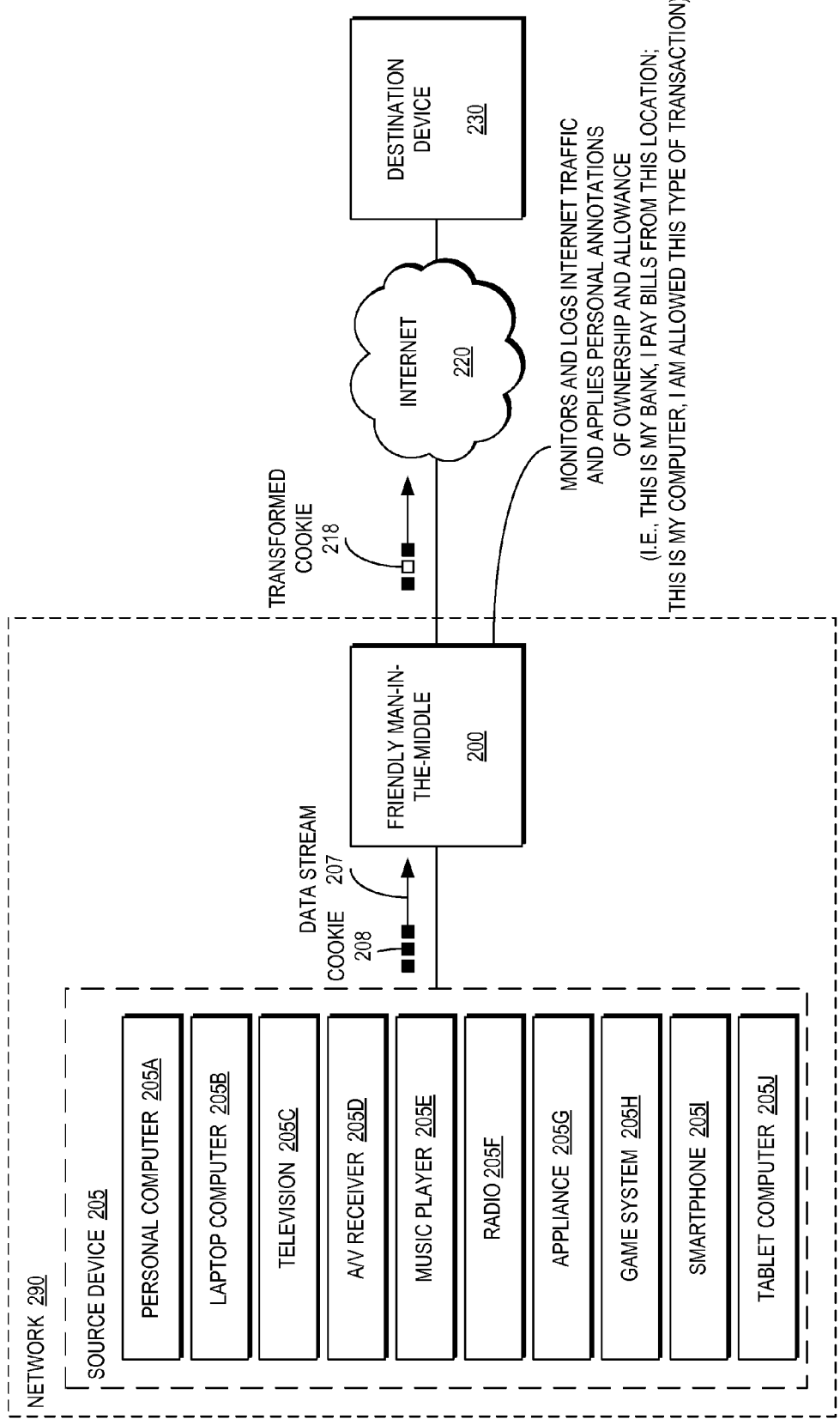

FIG. 2 is a block diagram illustrating an example embodiment of the present invention 200 in a network environment 290. As illustrated in FIG. 2, the network 290 includes a source device 205 (e.g., personal computer 205A, laptop computer 205B, television 205C, A/V receiver 205D, music player 205E, radio 205F, appliance 205G, game system 205H, smartphone 205I, and table computer 205J) that may transmit a data stream 207, including a cookie 208, intended for a destination (e.g., destination device 230). However, a FMITM 200 receives (i.e., intercepts) the data stream 207 before the data stream escapes the network 290 toward the destination device 230 over the Internet 220. It should be understood that the FMITM 200 may intercept both wired (e.g., over Ethernet) and wireless (e.g., over WiFi) data streams 207 in the network 290.

Likewise, the FMITM 200 may include additional hardware, such as a picocell, from a cellular telephony carrier to permit the FMITM 200 to intercept wireless communications (i.e., voice and data) from cellular telephones, tablet computers and the like connected to the cellular telephony carrier (e.g., over 3G or 4G connections). The FMITM 200 then forwards the cookie 108 out of the network 290 to the intended destination device 230 as a transformed data stream 218 according to the lexical analysis. In other embodiments, the FMITM 200 may include hardware to act as a repeater for the cellular telephony carrier so that it may intercept wireless communications and forward them back to the cellular telephony carrier's network (e.g., 3G or 4G network).

Figure 3:
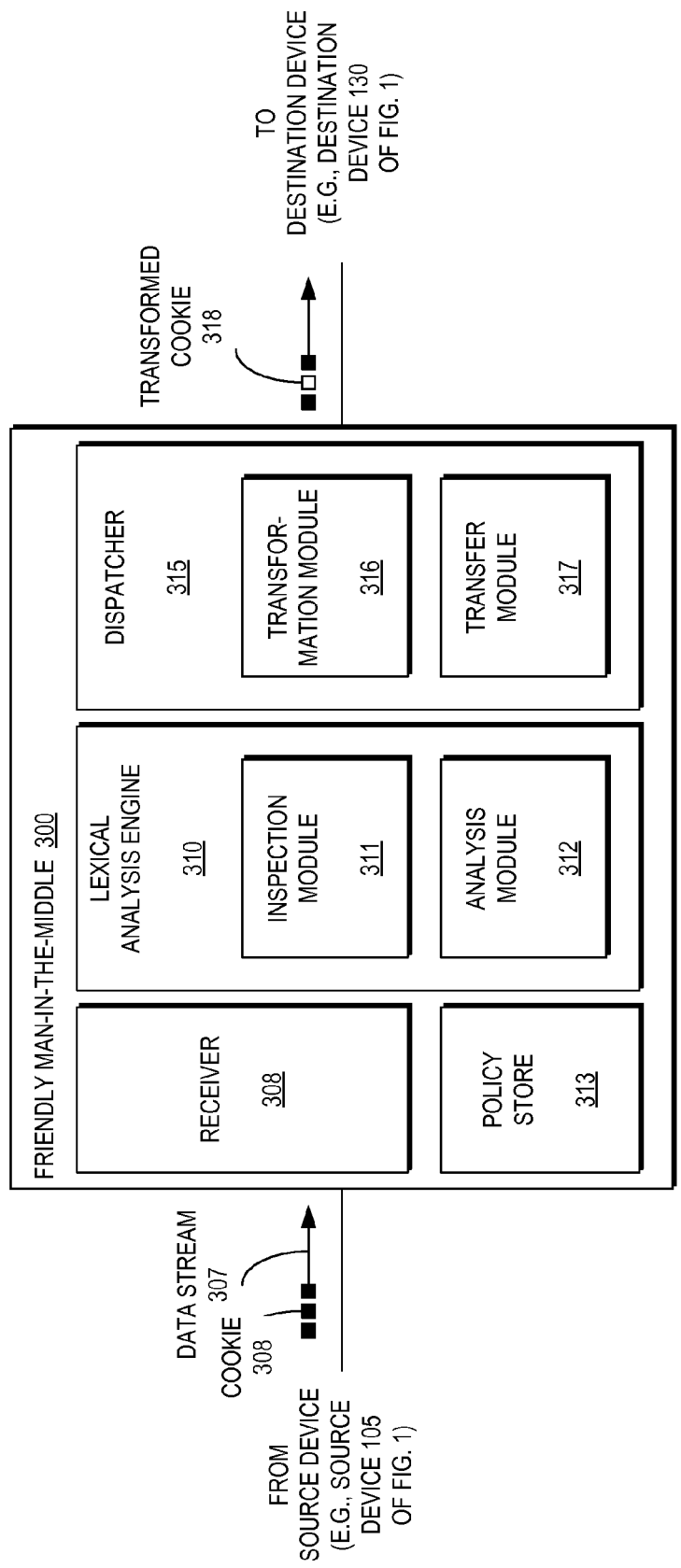
FIG. 3 is a block diagram illustrating an example embodiment of the present invention for removing privacy-related information from a cookie.

FIG. 3 is a block diagram illustrating an example embodiment of the present invention 300 for blocking or anonymizing a cookie 308 included in a data stream 307. FIGS. 4A-4D are flow diagrams illustrating methods for blocking or anonymizing a cookie according to example embodiments of the present invention. FIGS. 3 and 4A-4D may be described in conjunction.

Figure 4A:
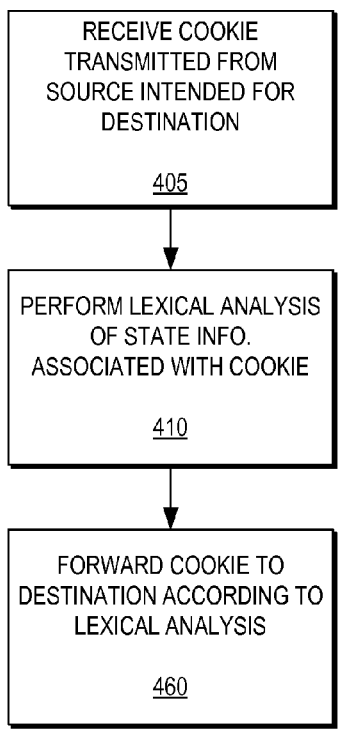
FIGS. 4A-4D are a flow diagram illustrating methods for blocking or anonymizing a cookie according to example embodiments of the present invention.

As illustrated in FIGS. 3 and 4A, a FMITM 300 includes a receiver 308 configured to receive a data stream 307, including a cookie 308, transmitted from a source (e.g., source device 105 of FIG. 1) intended for a destination (e.g., destination device 130 of FIG. 1) (405). A lexical analysis engine 310 then performs a lexical analysis of content of the cookie included in the data stream to determine state information associated with the cookie 308 (410). A dispatcher 315 then may forward the cookie 318 to the destination device (e.g., destination device 130 of FIG. 1) according to the lexical analysis performed by the lexical analysis engine 310 (460).

Figure 4B:
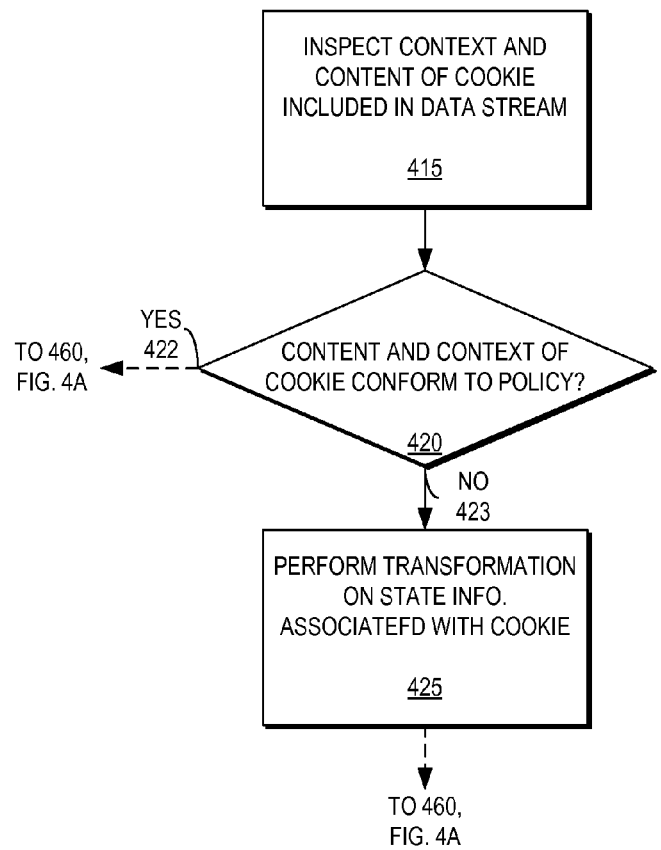
Figure 4C:
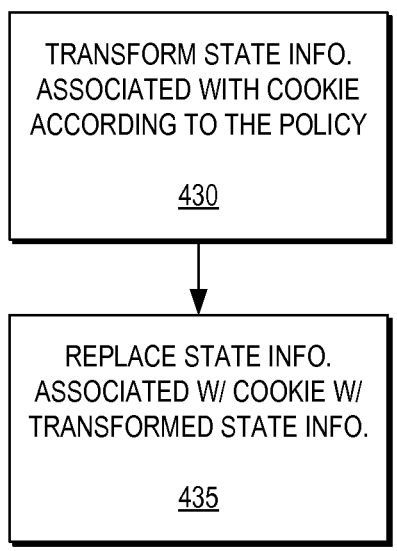

In certain embodiments, as illustrated in FIGS. 3 and 4B, the lexical analysis engine 310 may include an inspection module 311 that inspects the context and the content of the cookie 308 included in the data stream 307 (415) and an analysis module 312 that determines whether the context and the content of the cookie 308 included in the data stream 307 requires transformation of the content of the cookie 308 according to a policy (e.g., from the policy store 313) (420).

For example, the FMITM may analyze state information (i.e., attributes) of the cookie regarding the context of the cookie, such as frequency that the cookie was sent, rate that the cookie was sent, existence of the cookie, size of the cookie, source or destination Internet Protocol (IP) address of the cookie, identity of the source of the cookie, identity of the originating site of the cookie, identity of the site requesting the cookie, identity of the destination of the cookie, time of day the cookie was sent, and a number of destination sites for the cookie, including the identity of the source, the identity of the site where the cookie originated, the identity of the requesting site, the identity of the destination, a time of day the cookie was sent, frequency that the cookie was sent, the number of destination sites, the data fields of the requested cookie, and the size of the cookie. Such attributes can be leading indicators that the data is being harvested. The FMITM 300 also may inspect the content of the cookie, including name, age, gender, address, telephone number, email address, username, Internet Protocol (IP) address, salary, credit card number, banking account number, location, and online shopping history. The policies may be the results of the analysis of the cookies. For example, if a cookie collected data that an administrator did not want to share, a policy may be enabled to block that content from being sent to the requestor (or block the cookie in its entirety). Alternatively, the administrator could allow most of the content of the cookie but mask certain fields.

If the analysis module 312 determines that the context and the content of the cookie 308 do not require transformation of the state information associated with the content of the cookie 308 according to a policy (422), a transfer module 317 of the dispatcher 315 may forward the cookie 308 to the destination (e.g., destination device 130 of FIG. 1) (460). Conversely, if the analysis module 312 determines that the context and the content of the cookie 308 do require transformation of the state information associated with the content of the cookie 308 according to a policy (423), a transformation module 316 of the dispatcher 315 performs a transformation on the state information associated with the cookie 308 (425). As will be shown in FIGS. 5-8, in other words, the transformation module 316 transforms the state information associated with the cookie 308 according to the policy and replaces the state information associated with the cookie 308 with the transformed state information associated with the cookie 308 to conform to the policy. The transfer module 317 of the dispatcher 315 then forwards the transformed cookie 318 to the destination (e.g., destination device 130 of FIG. 1) (460).

When a user is utilizing the network, the user typically is unaware of cookies. Some users may be okay with cookies that allow them to take provide them some benefit, such as playing a game in exchange for the cookie collecting some information about the users. However, cookies also may be hijacked wherein information in the cookie is replaced so information collected by the cookie is sent to both the intended recipient and the hijacker. Other exploits include cookies that install an application (e.g., malware) on the user's system that collects additional information.

Figure 4D:
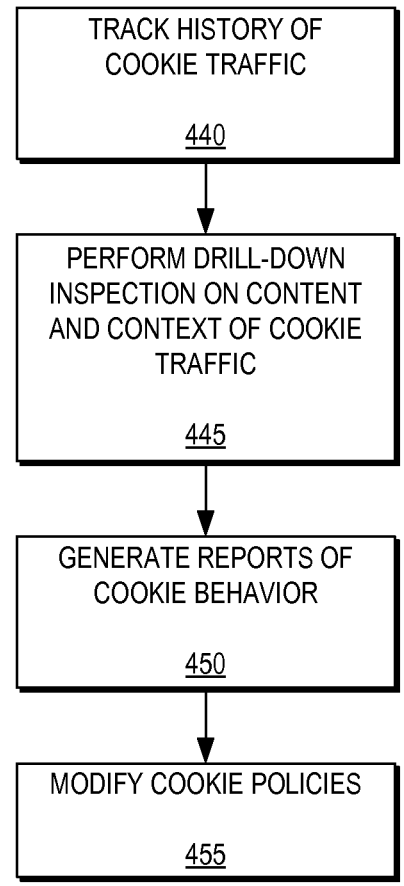

As illustrated in FIGS. 3 and 4D, example embodiments of the present invention tracking a history of cookie traffic (440) and perform drill-down inspection on the content and context of the cookie traffic (445). For example, performing drill-down inspection on the content and context of the cookie traffic provides structured content analysis and modification of unstructured cookie data and yields the following advantages: anonymization of cookie data (e.g., name, age, gender, address, telephone number, email address, username, Internet Protocol (IP) address, salary, credit card number, banking account number, location, and online shopping history); validating whether the cookie is an initiated or uninitiated data transfer; monitoring cookies associated with destinations communicated with by a user (e.g., a sudden transaction of multiple unrelated cookies (i.e., cookie mine)); monitoring cookies of sites visited by users (i.e., parental monitoring); reporting cookie traffic behavior (e.g., detection of a sudden increase of financial transactions that are not authorized or expected; detection of a sudden increase in cookie traffic, a dramatic change in the average size of a cookie, or a substantial unknown structural change of the cookie); detecting privacy-related information; and detecting presence of malware on the source device causing unusual behavior within the source device (i.e., sudden cookie appearance can indicate presence of malware on the source device). An administrator then may cause the analysis module 312 to generate reports of cookie behavior (450), which may allow the administrator to detect sites that have received user telemetry information and how often this telemetry information is updated so the administrator may modify policies stored in the policy store 313 (455).

FIGS. 5A-5D are flow diagrams illustrating methods for preventing disclosure of privacy-related information from a cookie via cookie exploits according to example embodiments of the present invention. As illustrated in FIGS. 5A-5D, a source device (e.g., source device 105 of FIG. 1) may connect to an online location (502), perform a login (504), send a cookie to the online location (i.e., the proper site) (506), and be granted access to the online location (508). In the example embodiments of FIGS. 5A-5D, the session cookie 510 includes information identifying the online location, the user's name, and the user's authentication token for accessing the online location. At other times, the source device may connect to another online location (e.g., open another web page) (536). However, the other web page may be malicious and may execute a rogue script on the source device (538) to harvest (i.e., find) cookies on the source device (540).

The found cookies then may be sent, for example, to an unwelcome location, such as a malicious site (542), thereby giving the malicious site access to the content of the session cookie 544, including its associated online location, the user's name, and the user's authentication token for accessing the online location. It should be understood that, with respect to FIGS. 5A-5D as discussed below, rejecting or removing the cookie from the data stream may include modifying the contents of the cookie according to the policy and forwarding the modified cookie to the destination. Further, although cookies typically are in a parsable format, some may be a binary blob (i.e., lexical analysis fails), in which can the MITM 300 may block the cookie in its entirety.

Figure 5A:
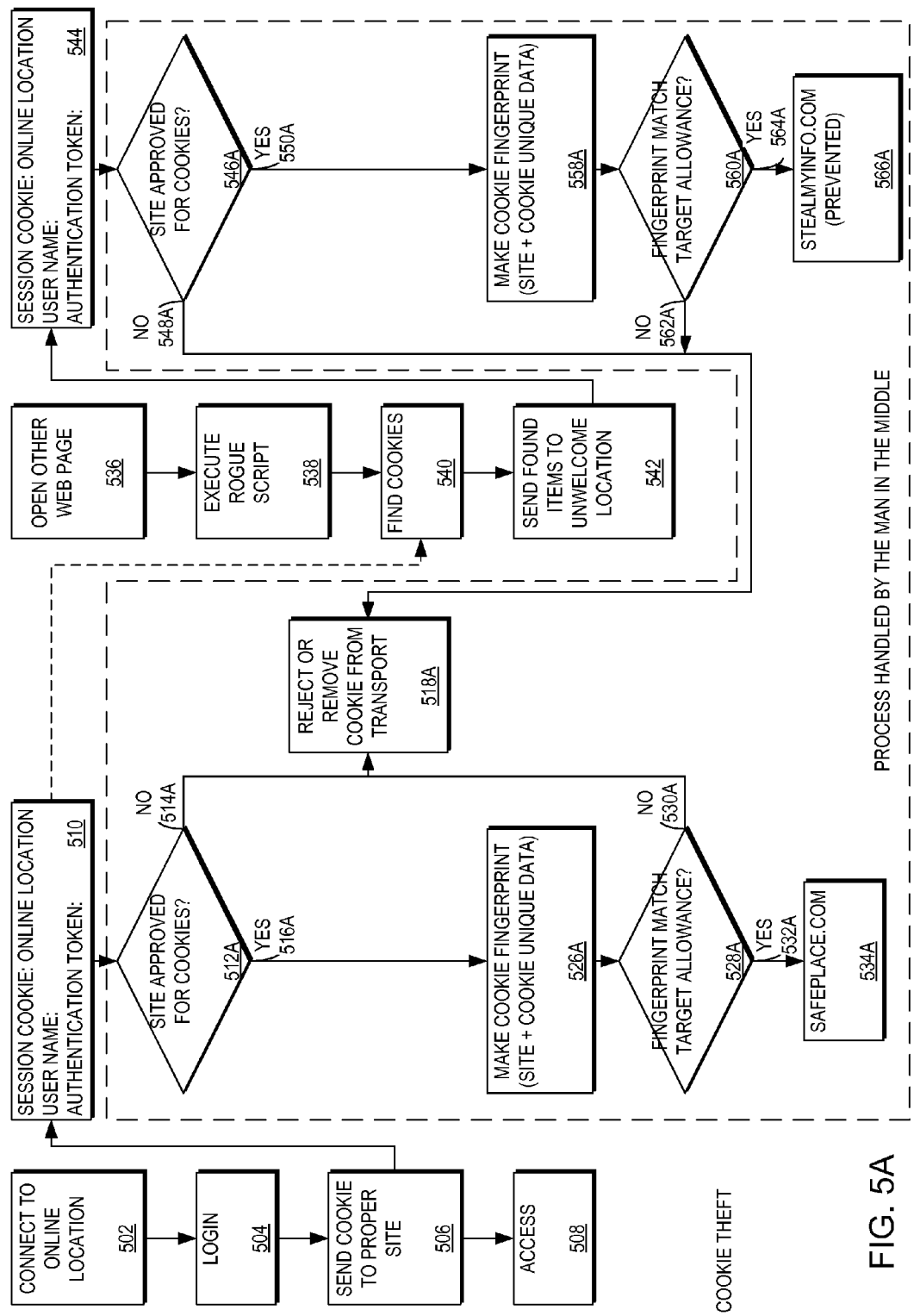
FIGS. 5A-5D are flow diagrams illustrating methods for preventing disclosure of privacy-related information from a cookie via cookie exploits according to example embodiments of the present invention.

As illustrated in FIGS. 3 and 5A, such cookie theft may be prevented by example embodiments of the present invention. When the session cookie 510 is sent from the source device to its destination, the FMITM 300 may receive (i.e., intercept) the cookie and determine whether the online location (i.e., site) requesting the cookie is approved according to a policy to receive cookies (512A). If the online location is not approved according to the policy to receive cookies (514A), the FMITM 300 may reject or remove the cookie from the data stream (518A). However, if the online location is approved according to the policy to receive cookies (516A), the FMITM 300 may perform a lexical analysis of the cookie to determine state information associated with the cookie and make a cookie fingerprint (526A). The FMITM 300 then may determine whether the cookie fingerprint matches the target allowance according to the policy (528A). If the fingerprint does not match the target allowance according to the policy (530A), the FMITM 300 may reject or remove the cookie from the data stream (518A). However, if the fingerprint does match the target allowance according to the policy (532A), the cookie is allowed to continue in the data stream to its destination (e.g., safeplace.com) (534A).

At other times, when the user visits another site and the rogue script sends the found cookies 544 to an unwelcome location, the FMITM 300 may receive (i.e., intercept) the cookie and determine whether the online location (i.e., site) requesting the cookie is approved according to a policy to receive cookies (546A). If the online location is not approved according to the policy to receive cookies (i.e., it is a rogue or malicious site stealing the cookie) (548A), the FMITM 300 may reject or remove the cookie from the data stream (518A). However, if the online location is approved according to the policy to receive cookies (550A), the FMITM 300 may perform a lexical analysis of the cookie to determine state information associated with the cookie and make a cookie fingerprint (558A). The FMITM 300 then may determine whether the cookie fingerprint matches the target allowance according to the policy (560A). If the fingerprint does not match the target allowance according to the policy (i.e., the rogue or malicious script is executing on a valid site according to the policy to harvest additional information) (562A), the FMITM 300 may reject or remove the cookie from the data stream (518A). The condition in which the fingerprint does match the target allowance (564A) is a false condition and is prevented by the FMITM 300 (i.e., a condition in which the site is approved for cookies (550A) and the fingerprint matches the target allowance (564A) would not be as a result of a rogue script on a malicious site but rather would only occur in online transaction with the online location itself).

Figure 5B:
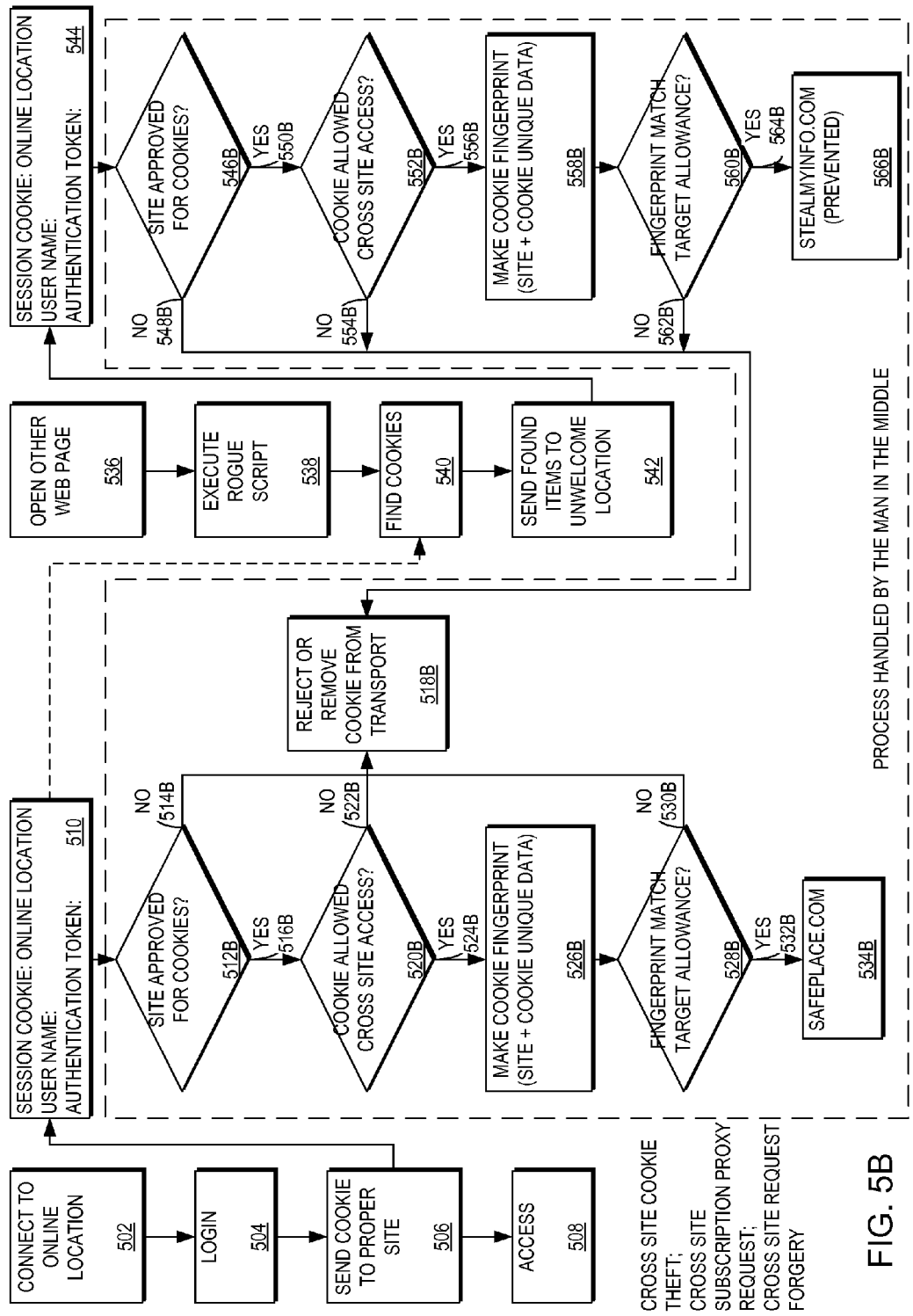

As illustrated in FIGS. 3 and 5B, cross site cookie theft, cross site subscription proxy requests, and cross site request forgery may be prevented by example embodiments of the present invention. In general, in cross site access, a cookie for a first site is requested by a second site (e.g., a cookie containing online shopping history information for an online merchant may be requested by a portal site to provide content for an advertisement for the online merchant). Further, a cross site subscription proxy request redirects all cookies to another site (e.g., a proxy), which then may forward the cookies to their intended destination. Cross site request forgery (CSRF or XSRF) is a type of malicious exploit of a website whereby unauthorized commands are transmitted from a user that the website trusts.

When the session cookie 510 is sent from the source device to its destination, the FMITM 300 may receive (i.e., intercept) the cookie and determine whether the online location (i.e., site) requesting the cookie is approved according to a policy to receive cookies (512B). If the online location is not approved according to the policy to receive cookies (514B), the FMITM 300 may reject or remove the cookie from the data stream (518B). However, if the online location is approved according to the policy to receive cookies (516B), the FMITM 300 may determine whether the requested cookie is allowed cross site access according to the policy (520B). If the cookie is not allowed cross site access (522B), the FMITM 300 may reject or remove the cookie from the data stream (518B). However, if the cookie is allowed cross site access (524B), the FMITM 300 may perform a lexical analysis of the cookie to determine state information associated with the cookie and make a cookie fingerprint (526B). The FMITM 300 then may determine whether the cookie fingerprint matches the target allowance according to the policy (528B). If the fingerprint does not match the target allowance according to the policy (530B), the FMITM 300 may reject or remove the cookie from the data stream (518B). However, if the fingerprint does match the target allowance according to the policy (532B), the cookie is allowed to continue in the data stream to its destination (e.g., safeplace.com) (534B).

At other times, when the user visits another site and the rogue script sends the found cookies 544 to an unwelcome location, the FMITM 300 may receive (i.e., intercept) the cookie and determine whether the online location (i.e., site) requesting the cookie is approved according to a policy to receive cookies (546B). If the online location is not approved according to the policy to receive cookies (i.e., it is a rogue or malicious site stealing the cookie) (548B), the FMITM 300 may reject or remove the cookie from the data stream (518B). However, if the online location is approved according to the policy to receive cookies (550B), the FMITM 300 may determine whether the requested cookie is allowed cross site access according to the policy (552B). If the cookie is not allowed cross site access (554B), the FMITM 300 may reject or remove the cookie from the data stream (518B). However, if the cookie is allowed cross site access (556B), the FMITM 300 may perform a lexical analysis of the cookie to determine state information associated with the cookie and make a cookie fingerprint (558B). The FMITM 300 then may determine whether the cookie fingerprint matches the target allowance according to the policy (560B). If the fingerprint does not match the target allowance according to the policy (i.e., the rogue or malicious script is executing on a valid site according to the policy to harvest additional information) (562B), the FMITM 300 may reject or remove the cookie from the data stream (518B). The condition in which the fingerprint does match the target allowance (564B) is a false condition and is prevented by the FMITM 300 (i.e., a condition in which the site is approved for cookies (550B), the cookie is allowed cross site access (556B), and the fingerprint matches the target allowance (564B) would not be as a result of a rogue script on a malicious site but rather would only occur in online transaction with the online location itself).

Figure 5C:
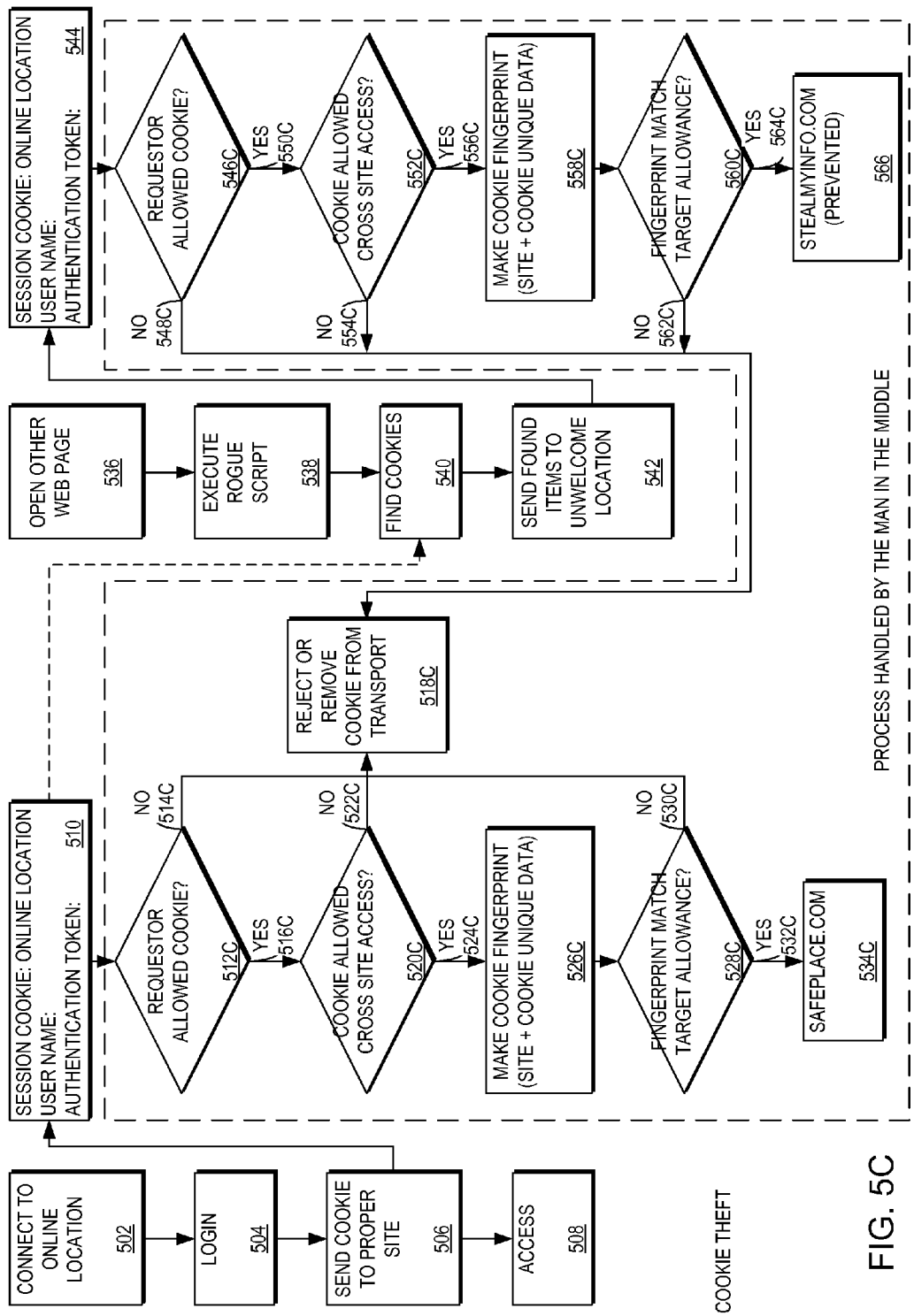

As illustrated in FIGS. 3 and 5C, cookie theft may be prevented by example embodiments of the present invention. When the session cookie 510 is sent from the source device to its destination, the FMITM 300 may receive (i.e., intercept) the cookie and determine whether the requestor (i.e., other than the online location that generated the cookie) requesting the cookie is approved according to a policy to receive cookies (512C). If the requestor is not approved according to the policy to receive cookies (514C), the FMITM 300 may reject or remove the cookie from the data stream (518C). However, if the requestor is approved according to the policy to receive cookies (516C), the FMITM 300 may determine whether the requested cookie is allowed cross site access according to the policy (520C). If the cookie is not allowed cross site access (522C), the FMITM 300 may reject or remove the cookie from the data stream (518C). However, if the cookie is allowed cross site access (524C), the FMITM 300 may perform a lexical analysis of the cookie to determine state information associated with the cookie and make a cookie fingerprint (526C). The FMITM 300 then may determine whether the cookie fingerprint matches the target allowance according to the policy (528C). If the fingerprint does not match the target allowance according to the policy (530C), the FMITM 300 may reject or remove the cookie from the data stream (518C). However, if the fingerprint does match the target allowance according to the policy (532C), the cookie is allowed to continue in the data stream to its destination (e.g., safeplace.com) (534C).

At other times, when the user visits another site and the rogue script sends the found cookies 544 to an unwelcome location, the FMITM 300 may receive (i.e., intercept) the cookie and determine whether the requestor requesting the cookie is approved according to a policy to receive cookies (546C). If the requestor is not approved according to the policy to receive cookies (i.e., it is a rogue or malicious site stealing the cookie) (548C), the FMITM 300 may reject or remove the cookie from the data stream (518C). However, if the requestor is approved according to the policy to receive cookies (550C), the FMITM 300 may determine whether the requested cookie is allowed cross site access according to the policy (552C). If the cookie is not allowed cross site access (554C), the FMITM 300 may reject or remove the cookie from the data stream (518C). However, if the cookie is allowed cross site access (556C), the FMITM 300 may perform a lexical analysis of the cookie to determine state information associated with the cookie and make a cookie fingerprint (558C). The FMITM 300 then may determine whether the cookie fingerprint matches the target allowance according to the policy (560C). If the fingerprint does not match the target allowance according to the policy (i.e., the rogue or malicious script is executing on a valid site according to the policy to harvest additional information) (562C), the FMITM 300 may reject or remove the cookie from the data stream (518C). The condition in which the fingerprint does match the target allowance (564C) is a false condition and is prevented by the FMITM 300 (i.e., a condition in which the site is approved for cookies (550C), the cookie is allowed cross site access (556C), and the fingerprint matches the target allowance (564C) would not be as a result of a rogue script on a malicious site but rather would only occur in online transaction with the online location itself).

Figure 5D:
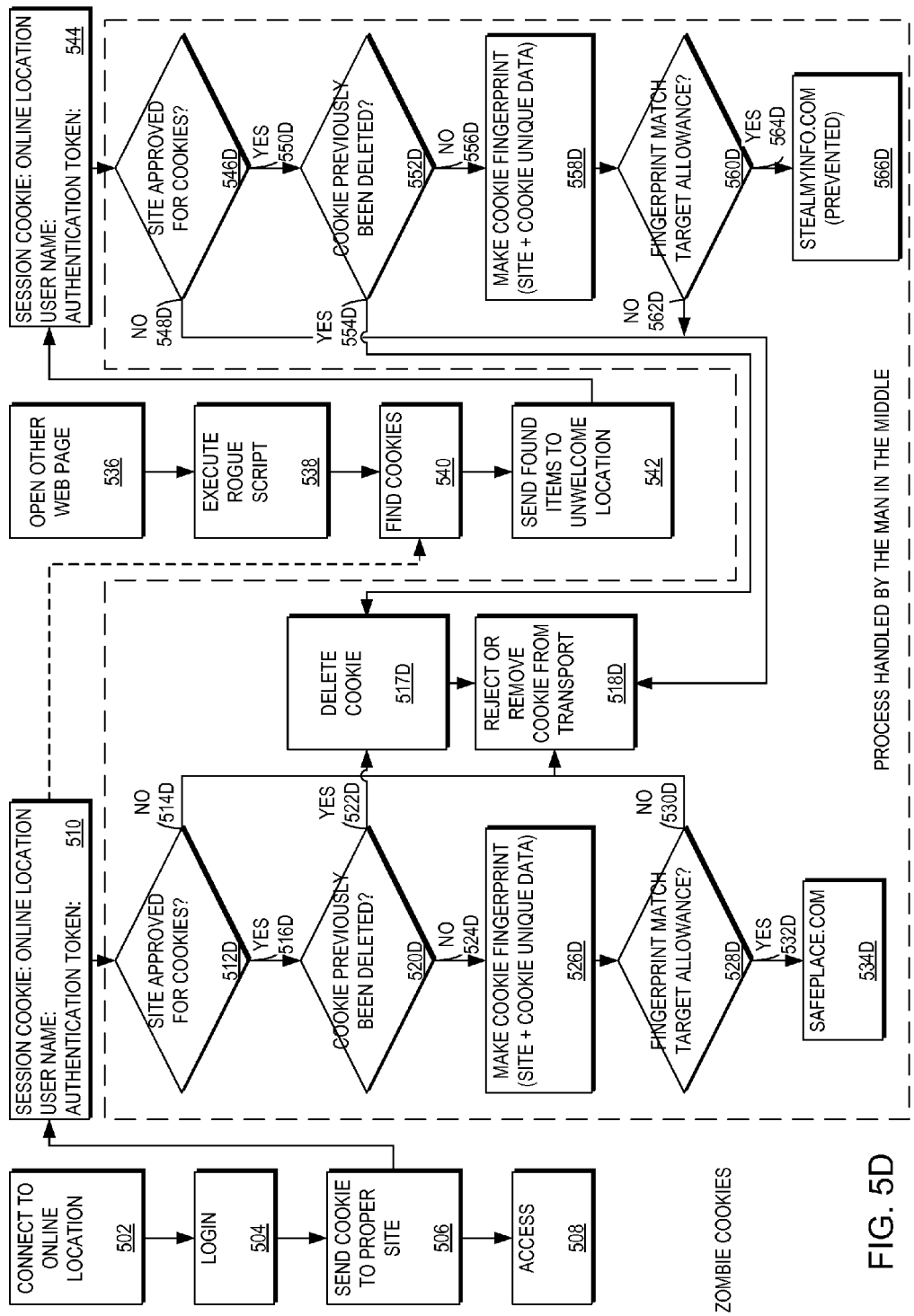

As illustrated in FIGS. 3 and 5D, the effects of zombie cookies may be diminished by example embodiments of the present invention until the cause is determined. A zombie cookie is any HTTP cookie that is recreated after deletion from backups stored outside the web browser's dedicated cookie storage, in a breach of browser security. This makes them very difficult to remove. When the session cookie 510 is sent from the source device to its destination, the FMITM 300 may receive (i.e., intercept) the cookie and determine whether the site (i.e., the online location that generated the cookie) requesting the cookie is approved according to a policy to receive cookies (512D). If the site is not approved according to the policy to receive cookies (514D), the FMITM 300 may reject or remove the cookie from the data stream (518D). However, if the site is approved according to the policy to receive cookies (516D), the FMITM 300 may determine whether the requested cookie previously has been deleted (520D). If the cookie previously has been deleted (522D), the FMITM 300 may delete the cookie (517D) and then may reject or remove the cookie from the data stream (518D). However, if the cookie previously has not been deleted (524D), the FMITM 300 may perform a lexical analysis of the cookie to determine state information associated with the cookie and make a cookie fingerprint (526D). The FMITM 300 then may determine whether the cookie fingerprint matches the target allowance according to the policy (528D). If the fingerprint does not match the target allowance according to the policy (530D), the FMITM 300 may reject or remove the cookie from the data stream (518D). However, if the fingerprint does match the target allowance according to the policy (532D), the cookie is allowed to continue in the data stream to its destination (e.g., safeplace.com) (534D).

At other times, when the user visits another site and the rogue script sends the found cookies 544 to an unwelcome location, the FMITM 300 may receive (i.e., intercept) the cookie and determine whether the site requesting the cookie is approved according to a policy to receive cookies (546D). If the site is not approved according to the policy to receive cookies (i.e., it is a rogue or malicious site stealing the cookie) (548D), the FMITM 300 may reject or remove the cookie from the data stream (518D). However, if the site is approved according to the policy to receive cookies (550D), the FMITM 300 may determine whether the requested cookie previously has been deleted (552D). If the cookie previously has been deleted (554D), the FMITM 300 may delete the cookie (517D) and then may reject or remove the cookie from the data stream (518D). However, if the cookie previously has not been deleted (556D), the FMITM 300 may perform a lexical analysis of the cookie to determine state information associated with the cookie and make a cookie fingerprint (558D). The FMITM 300 then may determine whether the cookie fingerprint matches the target allowance according to the policy (560D). If the fingerprint does not match the target allowance according to the policy (i.e., the rogue or malicious script is executing on a valid site according to the policy to harvest additional information) (562D), the FMITM 300 may reject or remove the cookie from the data stream (518D). The condition in which the fingerprint does match the target allowance (564D) is a false condition and is prevented by the FMITM 300 (i.e., a condition in which the site is approved for cookies (550D), the cookie previously has not been deleted (556D), and the fingerprint matches the target allowance (564D) would not be as a result of a rogue script on a malicious site but rather would only occur in online transaction with the online location itself).

Figure 6:
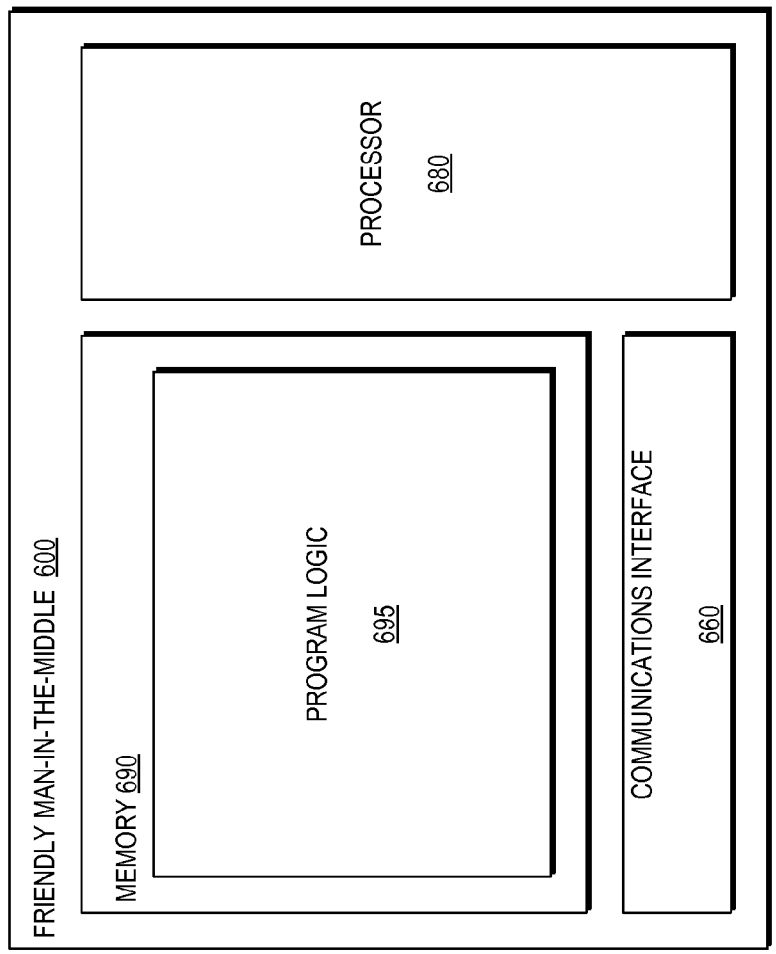
FIG. 6 is a block diagram of an example embodiment apparatus according to the present invention.

FIG. 6 is a block diagram of an example embodiment FMITM 600 according to the present invention. The FMITM 600 includes memory 690 storing program logic 695, a processor 680, and a communications interface 660.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 6, the machine becomes an apparatus for practicing the invention. When implemented on one or more general-purpose processors, the program code combines with such a processor to provide a unique apparatus that operates analogously to specific logic circuits. As such a general purpose digital machine can be transformed into a special purpose digital machine.

Figure 7:
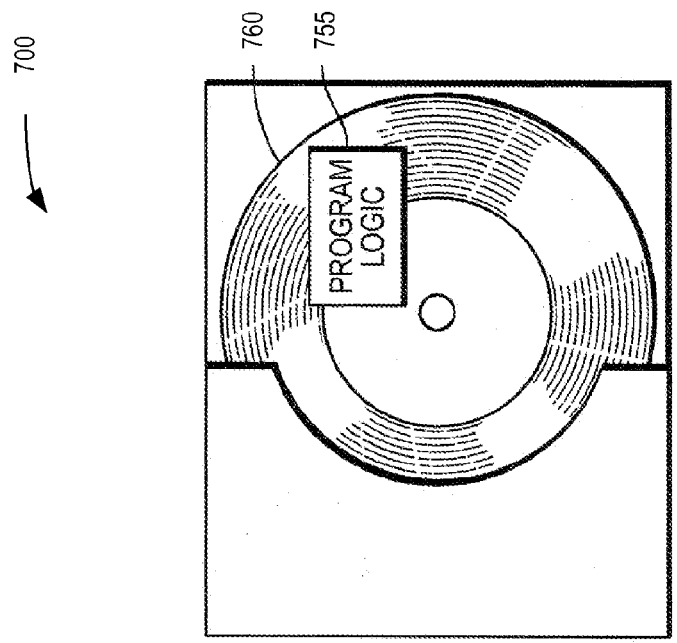
FIG. 7 is an illustration of an example embodiment of the present invention as embodied in program code.

FIG. 7 shows program logic 755 embodied on a computer-readable medium 760 as shown, and wherein the logic is encoded in computer-executable code configured for carrying out the gas controlling process of this invention and thereby forming a computer program product 700.

The logic for carrying out the method may be embodied as part of the aforementioned system, which is useful for carrying out a method described with reference to embodiments shown in, for example, FIGS. 1-5. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

In reading the above description, persons skilled in the art will realize that there are many apparent variations that can be applied to the methods and systems described. In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A computer-implemented method comprising:
receiving a cookie included in a data stream transmitted from a source device intended for a destination device by an intercepting device other than the source device and the destination device, not otherwise required for transmission of the data stream from the source device to the destination device and collocated with the source device in a network at a location in a data path between the source device and the destination device before the data stream leaves the network;
performing a lexical analysis of the cookie included in the data stream to determine state information associated with the cookie;
inspecting context and content of the cookie included in the data stream;
creating a cookie fingerprint based on the context and the content of the cookie included in the data stream;
determining whether the context and the content of the cookie included in the data stream requires transformation of the state information associated with the cookie according to a determination of whether the cookie fingerprint matches a target allowance according to a policy;

performing a transformation on the state information associated with the cookie according to the determination to generate a transformed cookie as part of a transformed data stream; and forwarding the transformed data stream out of the network toward the destination device.

2. The method of claim 1 wherein performing a transformation on the state information associated with the cookie according to the lexical analysis to generate a transformed cookie comprises performing a transformation on the state information associated with the cookie according to the determination of whether the context and the content of the cookie included in the data stream requires transformation of the state information associated with the cookie according to the policy; and wherein forwarding the transformed data stream to the destination comprises forwarding the transformed data stream to the destination device according to the policy.

3. The method of claim 2 wherein performing a transformation on the state information associated with the cookie according to the determination of whether the context and the content of the cookie included in the data stream requires transformation of the state information associated with the cookie according to the policy comprises:

transforming the state information associated with the cookie according to the policy; and replacing the state information associated with the cookie with the transformed state information to conform to the policy.

4. The method of claim 2 wherein inspecting content of the cookie included in the data stream comprises inspecting at least one attribute of state information selected from the group consisting of: name, age, gender, address, telephone number, email address, username, Internet Protocol (IP) address, salary, credit card number, banking account number, location, and online shopping history.

5. The method of claim 2 wherein inspecting context of the cookie included in the data stream comprises inspecting at least one attribute of state information selected from the group consisting of: frequency that the cookie was sent, rate that the cookie was sent, existence of the cookie, size of the cookie, source or destination Internet Protocol (IP) address of the cookie, identity of the source of the cookie, identity of the originating site of the cookie, identity of the site requesting the cookie, identity of the destination of the cookie, time of day the cookie was sent, and a number of destination sites for the cookie.

6. The method of claim 1 wherein receiving a cookie included in a data stream transmitted from a source intended for a destination comprises receiving the cookie included in the data stream transmitted from the source intended for the destination in a manner irrespective of source-type; and wherein forwarding the cookie to the destination comprises forwarding the transformed data stream to the destination in a manner transparent to the destination.

7. The method of claim 1 wherein performing a lexical analysis of the cookie included in the data stream to determine state information associated with the cookie comprises:

tracking a history of cookie traffic; and performing drill-down inspection on the content and context of cookies included in the cookie traffic.

8. The method of claim 7 wherein performing drill-down inspection on the content and context of cookies included in the cookie traffic provides structured content analysis of unstructured cookie data, the method further comprising:

generating a report of cookie behavior; and enabling modification of the policy according to the report of cookie behavior.

9. The method of claim 7 wherein performing drill-down inspection on the content and context of cookies included in the cookie traffic comprises at least one of:

validating whether the cookie is an initiated or uninitiated data transfer;

monitoring cookies associated with destinations communicated with by a user;

detecting unexpected cookie traffic behavior;

detecting privacy-related information; and detecting presence of malware on the source device causing unusual behavior within the source device.

10. An apparatus comprising:

a receiver configured to receive a cookie included in a data stream transmitted from a source device intended for a destination device, the apparatus comprising an intercepting device other than the source device and the destination device, not otherwise required for transmission of the data stream from the source device to the destination device and collocated with the source device in a network at a location in a data path between the source device and the destination device before the data stream leaves the network;

a lexical analysis engine configured to perform a lexical analysis of the cookie included in the data stream to determine state information associated with the cookie;

an inspection module configured to inspect context and content of the cookie included in the data stream and create a cookie fingerprint based on the context and the content of the cookie included in the data stream;

an analysis module configured to determine whether the context and the content of the cookie included in the data stream requires transformation of the state information associated with the cookie according to a determination of whether the cookie fingerprint matches a target allowance according to a policy;

a transformation module configured to perform a transformation on the state information associated with the cookie according to the determination to generate a transformed cookie as part of a transformed data stream; and a dispatcher configured to forward the transformed data stream out of the network toward the destination device.

11. The apparatus of claim 10 wherein the transformation module is further configured to perform a transformation on the state information associated with the cookie according to the determination of whether the context and the content of the cookie included in the data stream requires transformation of the state information associated with the cookie according to the policy; and wherein the dispatcher is further configured to forward the transformed data stream to the destination device according to the policy.

12. The apparatus of claim 11 wherein the transformation module is further configured to transform the state information associated with the cookie according to the policy and replace the state information associated with the cookie with the transformed state information to conform to the policy.

13. The apparatus of claim 11 wherein the inspection module is further configured to inspect at least one attribute of state information selected from the group consisting of: name, age, gender, address, telephone number, email address, username, Internet Protocol (IP) address, salary, credit card number, banking account number, location, and online shopping history.

14. The apparatus of claim 11 wherein the inspection module is further configured to inspect at least one attribute of state information selected from the group consisting of: frequency that the cookie was sent, rate that the cookie was sent, existence of the cookie, size of the cookie, source or destination Internet Protocol (IP) address of the cookie, identity of the source of the cookie, identity of the originating site of the cookie, identity of the site requesting the cookie, identity of the destination of the cookie, time of day the cookie was sent, and a number of destination sites for the cookie.

15. The apparatus of claim 10
wherein the receiver is further configured to receive the cookie included in the data stream transmitted from the source intended for the destination in a manner irrespective of source-type; and
wherein the transfer module is further configured to forward the transformed data stream to the destination in a manner transparent to the destination.

16. The apparatus of claim 10
wherein the lexical analysis engine is further configured to track a history of cookie traffic; and
wherein the analysis module is further configured to perform drill-down inspection on the content and context of cookies included in the cookie traffic.

17. The apparatus of claim 16 wherein the analysis module is further configured to generate a report of cookie behavior and enable modification of the policy according to the report of cookie behavior.

18. The apparatus of claim 16 wherein the analysis module is further configured to validate whether the cookie is an initiated or uninitiated data transfer, monitor cookies associated with destinations communicated with by a user, detect unexpected cookie traffic behavior, detect privacy-related information, or detect presence of malware on the source device causing unusual behavior within the source device.

19. A computer program product including a non-transitory computer-readable storage medium encoded with computer-program code that, when executed on a processor of a computer, causes the computer to perform a lexical analysis of a cookie included in a data stream to determine state information associated with the cookie, the computer program product comprising:
computer program code for receiving the cookie included in the data stream transmitted from a source device intended for a destination device, the computer comprising an intercepting device other than the source device and the destination device, not otherwise required for transmission of the data stream from the source device to the destination device and collocated with the source device in a network at a location in a data path between the source device and the destination device before the data stream leaves the network;
computer program code for performing a lexical analysis of the cookie included in the data stream to determine state information associated with the cookie;
computer program code for inspecting context and content of the cookie included in the data stream;
computer program code for creating a cookie fingerprint based on the context and the content of the cookie included in the data stream;
computer program code for determining whether the context and the content of the cookie included in the data stream requires transformation of the state information associated with the cookie according to a determination of whether the cookie fingerprint matches a target allowance according to a policy;
computer program code for performing a transformation on the state information associated with the cookie according to the determination to generate a transformed cookie as part of a transformed data stream; and
computer program code forwarding the transformed data stream out of the network toward the destination device.

\* \* \* \* \*